United States Patent
O'Neal et al.

(10) Patent No.: US 11,560,307 B2
(45) Date of Patent: Jan. 24, 2023

(54) $CO_2$ HYDROGENATION IN REVERSE FLOW REACTORS

(71) Applicant: ExxonMobil Technology and Engineering Company, Annandale, NJ (US)

(72) Inventors: Everett J. O'Neal, Asbury, NJ (US); Anastasios I. Skoulidas, Pittstown, NJ (US); Joseph E. Gatt, Annandale, NJ (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 332 days.

(21) Appl. No.: 16/838,654

(22) Filed: Apr. 2, 2020

(65) Prior Publication Data
US 2021/0061656 A1    Mar. 4, 2021

Related U.S. Application Data

(60) Provisional application No. 62/891,638, filed on Aug. 26, 2019, provisional application No. 62/903,214, filed on Sep. 20, 2019.

(51) Int. Cl.
*C01B 3/38* (2006.01)
*B01J 8/02* (2006.01)

(52) U.S. Cl.
CPC ............. *C01B 3/384* (2013.01); *B01J 8/0285* (2013.01); *C01B 3/382* (2013.01);
(Continued)

(58) Field of Classification Search
CPC . C01B 3/384; C01B 3/382; C01B 2203/0238; C01B 2203/0283; C01B 2203/1041; C01B 2203/1205
See application file for complete search history.

(56) References Cited

U.S. PATENT DOCUMENTS 7,740,289 B2    1/2010    Tang
7,815,873 B2    10/2010    Sankaranarayanan et al.
(Continued)

FOREIGN PATENT DOCUMENTS

| KR | 101329861 B1 | 11/2013 |
| WO | 2013135710 A2 | 9/2013 |
| WO | 20190048236 A1 | 3/2019 |

OTHER PUBLICATIONS

Van Sint, et al "A Novel Reverse Flow Reactor Coupling Endothermic and Exothermic Reactions: An Experimental Study", Chemical Engineering Science, 2002, vol. 57, pp. 4967-4985.
(Continued)

*Primary Examiner* — Jafar F Parsa
(74) *Attorney, Agent, or Firm* — Shook, Hardy & Bacon L.L.P.

(57) ABSTRACT

Systems and methods are provided for hydrogenation of $CO_2$ in a reverse flow reactor environment via a reverse water gas shift reaction. A reverse flow reactor environment is suitable for performing endothermic reactions at high temperatures, where a reactant flow is passed into the reactor in a first portion of the cycle in a first flow direction while a combustion or heating flow is passed into the reactor during a second portion of the reaction cycle from the opposite direction. This can allow for efficient heating of surfaces within the reactor to provide heat for the endothermic reverse water gas shift reaction while reducing or minimizing incorporation of combustion products into the desired reaction products.

20 Claims, 8 Drawing Sheets

(52) U.S. Cl.
CPC ............... *B01J 2208/00017* (2013.01); *B01J 2208/00539* (2013.01); *B01J 2208/00548* (2013.01); *B01J 2208/00769* (2013.01); *C01B 2203/0238* (2013.01); *C01B 2203/0283* (2013.01); *C01B 2203/061* (2013.01); *C01B 2203/1041* (2013.01); *C01B 2203/1205* (2013.01); *C01B 2203/14* (2013.01)

(56) References Cited

U.S. PATENT DOCUMENTS

| | | |
|---|---|---|
| 8,754,276 B2 | 1/2014 | Buchanan et al. |
| 2003/0162846 A1* | 8/2003 | Wang ................... B01J 8/0488 518/703 |
| 2007/0149392 A1* | 6/2007 | Ku ....................... C10G 2/332 423/220 |
| 2012/0111315 A1 | 5/2012 | Grenda et al. |
| 2015/0129805 A1 | 5/2015 | Karpenko et al. |
| 2017/0137285 A1 | 5/2017 | Ide et al. |

OTHER PUBLICATIONS

The International Search Report and Written Opinion for PCT/US2020/026391 dated Jun. 24, 2020.

* cited by examiner

CO₂ HYDROGENATION IN REVERSE FLOW REACTORS

CROSS REFERENCE TO RELATED APPLICATIONS

This application claims priority to U.S. Provisional Application Ser. No. 62/891,638 filed Aug. 26, 2019 and U.S. Provisional Application Ser. No. 62/903,214 filed Sep. 20, 2019, both of which are herein incorporated by reference in its entirety.

FIELD

This invention relates to systems and methods for performing $CO_2$ hydrogenation in reactors that utilize alternating directions of flow.

BACKGROUND $CO_2$ is a common reaction product from a variety of reaction processes involving carbon compounds. In addition to formation of $CO_2$ during combustion, $CO_2$ can also be formed during other refinery or chemical production processes, such as hydrocarbon reforming. Due to the prevalence of combustion processes and other processes that generate $CO_2$ as a reaction product, methods that can provide a disposition for $CO_2$ other than exhaust into the atmosphere are desirable.

One reaction that can consume $CO_2$ as a reaction input is the reverse water gas shift reaction. In the reverse water gas shift reaction, $CO_2$ and $H_2$ can be converted into CO and $H_2O$ in the presence of a suitable catalyst. This reaction is an equilibrium process, so the ability to consume $CO_2$ is dependent on the reaction conditions and the relative concentrations of the reactants and products. With regard to reaction conditions, conversion of $CO_2$ to CO is favored by increased temperatures.

Reverse flow reactors are an example of a reactor type that is beneficial for use in processes with cyclic reaction conditions. For example, due to the endothermic nature of reforming reactions, additional heat needs to be introduced on a consistent basis into the reforming reaction environment. Reverse flow reactors can provide an efficient way to introduce heat into the reaction environment. After a portion of the reaction cycle used for reforming or another endothermic reaction, a second portion of the reaction cycle can be used for combustion or another exothermic reaction to add heat to the reaction environment in preparation for the next reforming step. U.S. Pat. Nos. 7,815,873 and 8,754,276 provide examples of using reverse flow reactors to perform various endothermic processes in a cyclic reaction environment.

U.S. Pat. No. 7,740,289 describes production of synthesis gas in a reverse flow reactor by steam reforming followed by incomplete combustion of remaining hydrocarbons at elevated temperature and pressure. In addition to providing additional synthesis gas, the incomplete combustion provides heat to the reactor. In the method described in U.S. Pat. No. 7,740,289, the reversal of flow is achieved by alternating the end of the reactor used for input of the reactant flows for performing the steam reforming and incomplete combustion. The resulting synthesis gas can then be used for production of methanol.

U.S. Patent Application Publication 2012/0111315 describes an in-situ vaporizer and recuperator that is suitable for use with an alternating flow system, such as a pressure swing reformer.

SUMMARY

In various aspects, a method for performing a reaction in a reverse flow reactor is provided. The method includes reacting a fuel mixture comprising fuel, 0.1 vol % or more of $O_2$, and a diluent under combustion conditions in a combustion zone within a reverse flow reactor to form a flue gas and to heat a conversion zone to an average conversion zone temperature of 400° C. or more. The conversion zone can include a catalyst composition. The method further includes exposing a reactant stream comprising 5.0 vol % to 50 vol % $CO_2$, 20 vol % or more $H_2$, and a ratio of $H_2$ to $CO_2$ of 2.0 or more, to the catalyst composition in the conversion zone under reverse water gas shift reaction conditions to form a product stream comprising $H_2O$ and CO. A direction of flow for the reactant stream within the reaction zone can be reversed relative to a direction of flow for the fuel mixture.

DETAILED DESCRIPTION

Figure 1:
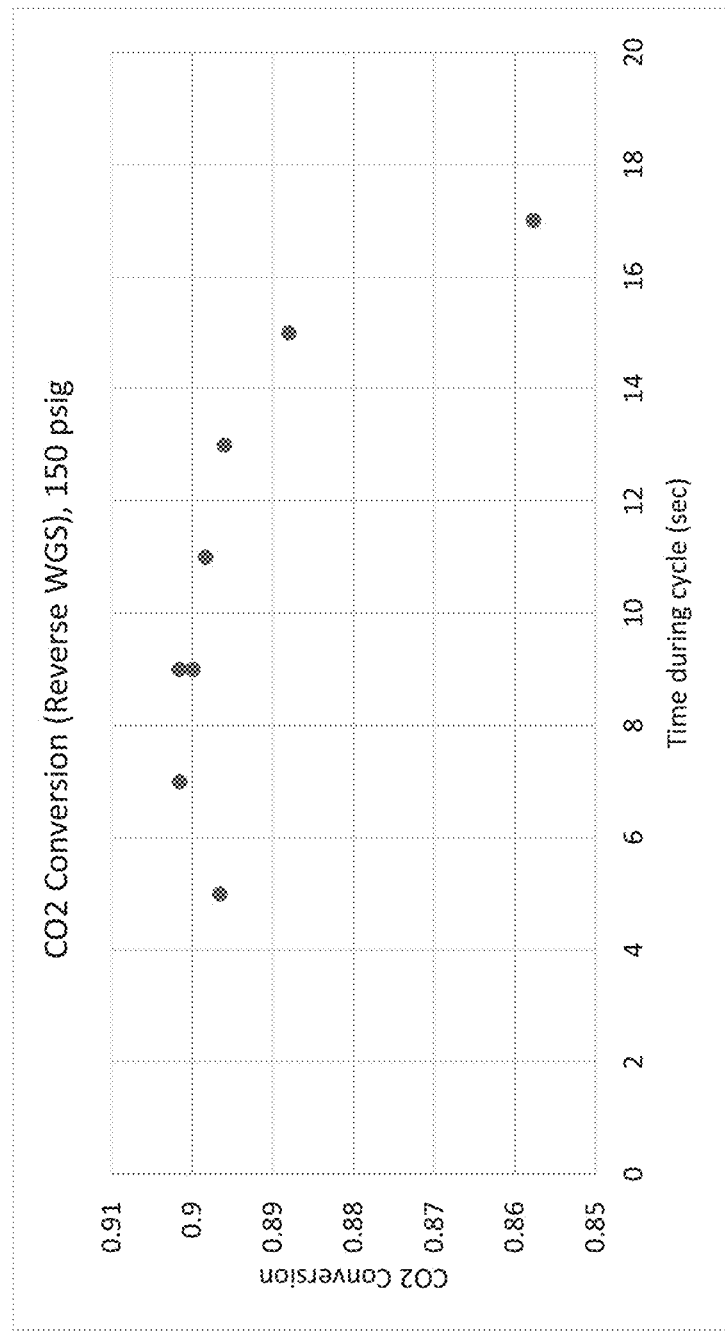
FIG. 1 shows $CO_2$ conversion during the water gas shift portion of the reaction cycle in a reverse flow reactor under a first set of conditions.

All numerical values within the detailed description and the claims herein are modified by "about" or "approximately" the indicated value, and take into account experimental error and variations that would be expected by a person having ordinary skill in the art.

Overview

In various aspects, systems and methods are provided for hydrogenation of $CO_2$ in a reverse flow reactor environment. A reverse flow reactor environment is suitable for performing endothermic reactions at high temperatures, where a reactant flow is passed into the reactor in a first portion of the cycle in a first flow direction while a combustion or heating flow is passed into the reactor during a second portion of the reaction cycle from the opposite direction. This can allow for efficient heating of surfaces within the reactor to provide heat for the endothermic reverse water gas shift reaction while reducing or minimizing incorporation of combustion products into the desired reaction products.

The reverse water gas shift reaction is a reaction that allows for conversion of a relatively inert compound ($CO_2$) to a compound that is susceptible to a wider variety of reactions. For example, catalyst and/or reactor configurations for performing Fischer-Tropsch synthesis or methanol synthesis can readily use CO as a reactant but typically cannot use $CO_2$. The reverse water gas shift reaction converts $CO_2$ and $H_2$ into CO and $H_2O$. As a result, performing the reverse water gas shift reaction can allow $CO_2$ and $H_2$ to be used to form synthesis gas, which can then be used for a synthesis reaction such as Fischer-Tropsch synthesis, methanol synthesis, or dimethyl ether synthesis.

Performing the reverse water gas shift reaction in a reverse flow reactor can provide a variety of advantages. Some advantages are related to the high temperatures that can be achieved in a reverse flow reactor. The reverse water gas shift reaction is part of the same equilibrium as the water gas shift reaction. In that equilibrium, formation of CO and $H_2O$ is favored by increased temperatures. In particular, due to a competing equilibrium reaction for formation of methane, the equilibrium conversion of $CO_2$ passes through a minimum at roughly 600° C. By performing the reverse water gas shift reaction at temperatures of 700° C. or more, or 800° C. or more, or 900° C. or more (such as up to 1600° C. or possibly still higher), the equilibrium conversion of $CO_2$ can be increased while operating at temperatures with relatively fast kinetics. In various aspects, the amount of $CO_2$ in the reaction products can be 0.5 vol % to 5.0 vol %, or 0.5 vol % to 3.0 vol %, or 0.5 vol % to 2.5 vol %, or 1.0 vol % to 5.0 vol %, or 1.0 vol % to 3.0 vol %, or 1.0 vol % to 2.5 vol %.

The elevated temperatures that can be achieved in a reverse flow reactor can also drive formation of CO and $H_2O$ under reverse water gas shift conditions. This can allow synthesis gas compositions to be produced from a reverse flow reactor that are desirable for a downstream synthesis process. In various aspects, the molar ratio of $H_2$ to CO in the products from a reverse flow reactor process can be between 1.9 to 3.1, or between 2.0 to 3.0. In this discussion, this ratio can also be referred to as the syngas ratio. Reaction products with a syngas ratio closer to 2.0 can be beneficial, for example, for Fischer-Tropsch synthesis and methanol synthesis. In other applications, such as using synthesis gas as a feed for fermentation (i.e., chemical production via algae or another bio-reaction pathway), a syngas ratio closer to 3.0 can be beneficial.

In some aspects, other advantages of performing the reverse water gas shift reaction in a reverse flow reactor can be related to the type of catalyst. For example, it has been discovered to that catalysts suitable for reforming of hydrocarbons at temperatures of 600° C. or more can also be suitable for performing the reverse water gas shift reaction. It has further been discovered that at pressures of 200 psig (~1400 kPa-g) or ore, or 290 psig (~2000 kPa-g) or more, methane can be added to a $CO_2$ feed to allow for conversion of the feed by both reforming and reverse water gas shift.

Still other advantages of using a reverse flow reactor for performing the reverse water gas shift reaction can be related to thermal management and reaction product management. During the regeneration step of a reaction cycle in a reverse flow reactor, heat is added to internal surfaces and/or structures within the reactor by performing combustion in a combustion zone. The internal surfaces and structures are exposed to the heat generated from combustion, with the heat being distributed by a diluent gas flow. This provides direct internal heating, which can reduce or minimize energy losses relative to indirect methods where an exterior portion of the reactor and/or reaction zone is heated, and thermal diffusion carries the heat from the external location to the interior surfaces where the endothermic reaction (e.g., reverse water gas shift reaction) is performed.

Yet other advantages of using a reverse flow reactor for performing the reverse water gas shift reaction can be related to reaction product management. In a reverse flow reactor, the regeneration step for addition of heat to the reactor occurs during a separate time period than the reaction step for performing the reverse water gas shift reaction (or another desired endothermic reaction). As a result, the combustion products from the regeneration step can be segregated from the reaction products for the reverse water gas shift reaction.

Reverse flow reactors and/or other reactors with flows in opposite directions at different stages of a reaction cycle can be useful when performing endothermic reactions at elevated temperatures. Examples of elevated temperatures correspond to 700° C. or more, or 800° C. or more, or 900° C. or more, such as up to 1600° C. or possibly still higher. A flow from a first direction, corresponding to a combustion or regeneration flow, can be used to heat a reaction zone within the reactor to a desired temperature. The reagents for a desired reaction can then be passed in using a flow in the opposite direction. The heat stored within the reactor during the regeneration step is used to provide heat for the desired endothermic reaction.

In this discussion, unless otherwise specified, all volume ratios correspond to volume ratios where the quantities in the ratio are specified based on volume at standard temperature and pressure (20° C., 100 kPa). This allows volume ratios to be specified consistently even though two flue gas volumes being compared may exist at different temperatures and pressures. When a volume ratio is specified for flue gases being delivered into a reactor, the corresponding flow rate of gas for a unit time under standard conditions can be used for the comparison.

In this discussion, unless otherwise specified, temperatures for reactor surfaces and/or temperatures within the reactor that are described herein correspond to temperatures at the peak temperature location in the conversion zone at the end of the regeneration step. The peak temperature in the conversion zone at the end of the regeneration step can be the highest temperature that the reactor surfaces will be exposed to during the reaction cycle. (It is possible that the absolute peak temperature in the reactor may be outside of the conversion zone, depending on the location where fuel is initially combusted during the regeneration step.) The location in the conversion zone where the peak temperature occurs at the end of the regeneration step can then be used as the reference location for characterizing the reactor temperature at other times during the reaction cycle. It is noted that the temperature of flue gas exiting from the reactor during regeneration will be different from the temperature at the peak temperature location.

Process Example—Reverse Water Gas Shift and Regeneration

An example of a reaction that can be performed in a reverse flow reactor system is the reverse water gas shift reaction. As a general overview of operation in a swing reactor, such as a reverse flow reactor, a regeneration step or portion of a reaction cycle can be used to provide heat for the reactor. The reverse water gas shift reaction can then occur within the reactor during a conversion step or portion of the cycle, with the reverse water gas shift reaction consuming heat provided during the reactor regeneration step. During reactor regeneration, fuel, an oxidant, and diluent are introduced into the reactor from a regeneration end of the reactor. The bed and/or monoliths in the regeneration portion of the reactor can absorb heat, but typically do not include a catalyst for the reverse water gas shift reaction, such as a reforming catalyst. As the fuel, oxidant, and diluent pass through the regeneration section, heat is transferred from the regeneration section to the fuel and oxidant. Combustion does not occur immediately, but instead the location of combustion is controlled to occur in a middle portion of the reactor. The flow of the fuel, oxidant, and diluent continues during the regeneration step, leading to additional transfer of the heat generated from combustion into the reforming end of the reactor.

After a sufficient period of time, the combustion reaction is stopped. Any remaining combustion products and/or reactants can optionally be purged. The conversion step or portion of the reaction cycle (i.e., the reverse water gas shift portion) can then start. The reactants for conversion can be introduced into the conversion end of the reactor, and thus flow in effectively the opposite direction relative to the flow during regeneration. The bed and/or monoliths in the conversion portion of the reactor can include a catalyst suitable for performing the reverse water gas shift reaction. In various aspects, at least a portion of the catalyst can correspond to a catalyst formed from a ceramic composition as described herein. As conversion occurs, the heat introduced into the conversion zone during combustion can be consumed by the endothermic reverse water gas shift reaction. Optionally, if a reforming catalyst is used, some heat can also be consumed by reforming of hydrocarbons present in the reactants for the conversion reaction. After exiting the conversion zone, the conversion products (and unreacted reactants) are no longer exposed to a conversion catalyst. As the conversion products pass through the regeneration zone, heat can be transferred from the products to the regeneration zone. After a sufficient period of time, the conversion process can be stopped, remaining conversion products can optionally be collected or purged from the reactor, and the cycle can start again with a regeneration step.

The conversion reaction performed within the reactor can correspond to the reverse water gas shift reaction (RWGS), as shown in Equation (1). Optionally, if a reforming catalyst is use to catalyze the reverse water gas shift reaction, some reforming can also occur. Equation (2) shows an example of the stoichiometry for steam reforming. It is noted that both Equation (1) and Equation (2) correspond to equilibrium processes.

$$\text{RWGS: } H_2 + CO_2 \Longleftrightarrow CO + H_2O \qquad (1)$$

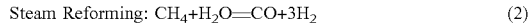

$$\text{Steam Reforming: } CH_4 + H_2O = CO + 3H_2 \qquad (2)$$

It is noted that the ratio of $H_2$ to CO in a synthesis gas generated by Equation (1) is dependent on the temperature, as well as the amounts of $CO_2$ and $H_2O$ that are present in the reaction environment. If reforming is also occurring, the equilibrium for the reforming reaction(s) can also impact the resulting syngas ratio.

Most reforming catalysts, such as rhodium and/or nickel, can serve as water gas shift catalysts. Thus, if reaction environment for producing $H_2$ and CO also includes $H_2O$ and/or $CO_2$, the initial stoichiometry from the reforming reaction may be altered based on the water gas shift equilibrium. This equilibrium is also temperature dependent, with higher temperatures favoring production of CO and $H_2O$. It is noted that higher temperatures can also improve the rate for reaching equilibrium.

One of the challenges in performing commercial scale endothermic reaction(s) can be providing the heat for the reaction(s) in an efficient manner while reducing or minimizing introduction of additional components into the desired product(s). Cyclic reaction systems, such as reverse flow reactor systems, can provide heat in a desirable manner by having a cycle including a conversion step and a regeneration step. During the regeneration step, combustion can be performed within a selected area of the reactor. A gas flow during regeneration (such as a gas flow including a diluent) can assist with transferring this heat from the combustion zone toward additional portions of the conversion zone in the reactor. The conversion step within the cycle can be a separate step, so that incorporation of products from combustion into the reactants and/or products from conversion can be reduced or minimized. The conversion step can consume heat, which can reduce the temperature of the conversion zone. As the products from conversion pass through the reactor, the conversion products can pass through a second zone that lacks a reforming or water gas shift catalyst. This can allow the reaction products to cool prior to exiting the reactor. The heat transferred from the conversion products to the reactor can then be used to increase the temperature of the reactants for the next combustion or regeneration step.

In various aspects, the feed for the reverse water gas shift reaction can include, 5.0 vol % to 50 vol % $CO_2$ and 20 vol % to 80 vol % $H_2$. The amount of $H_2$ in the feed can be sufficient to provide a ratio of $H_2$ to $CO_2$ in the feed of 2.0 or more, or 3.0 or more, such as up to 5.0 or possibly still higher Depending on the aspect, 5.0 vol % to 40 vol % of $H_2O$ can be included in the feed. In some aspects, 0.5 vol % to 20 vol % of a reformable hydrocarbon can be included in the feed, such as 1.0 vol % to 20 vol % of methane. The above values correspond to the volume percentages of reactants excluding diluents that may be present. For example, any $N_2$ present in the feed can be excluded when determining the volume percentages of reactants in the feed.

Within the conversion zone of a reverse flow reactor, the temperature can vary across the zone due to the nature of how heat is added to the reactor and/or due to the kinetics of the conversion reaction. The highest temperature portion of the zone can typically be found near a middle portion of the reactor. This middle portion can be referred to as a mixing zone where combustion is initiated during regeneration. At least a portion of the mixing zone can correspond to part of the conversion zone if a monolith with conversion catalyst extends into the mixing zone. As a result, the location where combustion is started during regeneration can typically be near to the end of the conversion zone within the reactor. Moving from the center of the reactor to the ends of the reactor, the temperature can decrease. As a result, the temperature at the beginning of the conversion zone (at the end of the reactor) can be cooler than the temperature at the end of the conversion zone (in the middle portion of the reactor).

As the conversion reaction occurs, the temperature within the conversion zone can be reduced. The rate of reduction in temperature can be related to the kinetic factors of the amount of available $CO_2$ for conversion and/or the temperature at a given location within the conversion zone. As the feed moves through the conversion zone, the reactants in the feed can be consumed, which can reduce the amount of conversion that occurs at downstream locations. However, the increase in the temperature of the conversion zone as the reactants move across the conversion zone can lead to an increased reaction rate.

When a sufficient portion of the conversion zone has a temperature below 800° C., or below 700° C., or below 600° C. (such as down to 400° C. or possibly still lower), the conversion step within the reaction cycle can be stopped to allow for regeneration. For example, when the average temperature of the conversion zone is 600° C. or less, or 500° C. or less, or 400° C. or less, such as down to 300° C., the conversion step can be stopped. Alternatively, based on the amount of heat introduced into the reactor during regeneration, the conversion portion of the reaction cycle can be stopped based on an amount of reaction time, so that the amount of heat consumed during conversion (plus heat lost to the environment) is roughly in balance with the amount of heat added during regeneration. After the conversion process is stopped, any remaining synthesis gas product still in the reactor can optionally be recovered prior to starting the regeneration step of the reaction cycle.

The regeneration process can then be initiated. During regeneration, a fuel such as methane, natural gas, or $H_2$, and oxygen can be introduced into the reactor and combusted. In some aspects, a diluent can also be introduced to facilitate transport of heat within the reactor. The location where the fuel and oxidant are allowed to mix can be controlled in any convenient manner, such as by introducing the fuel and oxidant via separate channels. By delaying combustion during regeneration until the reactants reach a central portion of the reactor, the non-conversion end of the reactor can be maintained at a cooler temperature. This can also result in a temperature peak in a middle portion of the reactor. The temperature peak can be located within a portion of the reactor that also includes the reforming catalyst. During a regeneration cycle, the temperature within the reactor can be increased sufficiently to allow for the conversion reaction during the conversion portion of the cycle. This can result in a peak temperature within the reactor of 1100° C. or more, or 1200° C. or more, or 1300° C. or more, or potentially a still higher temperature.

The relative length of time and reactant flow rates for the conversion and regeneration portions of the process cycle can be selected to balance the heat provided during regeneration with the heat consumed during conversion. For example, one option can be to select a conversion step that has a similar length to the regeneration step. Based on the flow rate of $H_2$ and/or $CO_2$ during the reforming step, an endothermic heat demand for the conversion reaction can be determined. This heat demand can then be used to calculate a flow rate for combustion reactants during the regeneration step. Of course, in other aspects the balance of heat between conversion and regeneration can be determined in other manners, such as by determining desired flow rates for the reactants and then selecting cycle lengths so that the heat provided by regeneration balances with the heat consumed during conversion.

In addition to providing heat, the reactor regeneration step during a reaction cycle can also allow for coke removal from the catalyst within the conversion zone. In various aspects, one or more types of catalyst regeneration can potentially occur during the regeneration step. One type of catalyst regeneration can correspond to removal of coke from the catalyst. During reforming, a portion of the $CO_2$ introduced into the conversion zone can form coke instead of forming CO. This coke can potentially block access to the catalytic sites (such as metal sites) of the catalyst. In some aspects, the rate of formation can be increased in portions of the conversion zone that are exposed to higher temperatures, such as portions of the reforming zone that are exposed to temperatures of 800° C. or more, or 900° C. or more, or 1000° C. or more. During a regeneration step, oxygen can be present as the temperature of the reforming zone is increased. At the temperatures achieved during regeneration, at least a portion of the coke generated during conversion can be removed as CO or $CO_2$.

Due to the variation in temperature across the reactor, several options can be used for characterizing the temperature within the reactor and/or within the conversion zone of the reactor. One option for characterizing the temperature can be based on an average bed or average monolith temperature within the reforming zone. In practical settings, determining a temperature within a reactor requires the presence of a measurement device, such as a thermocouple. Rather than attempting to measure temperatures within the conversion zone, an average (bed or monolith) temperature within the conversion zone can be defined based on an average of the temperature at the beginning of the conversion zone and a temperature at the end of the conversion zone. Another option can be to characterize the peak temperature within the conversion zone after a regeneration step in the reaction cycle. Generally, the peak temperature can occur at or near the end of the conversion zone, and may be dependent on the location where combustion is initiated in the reactor. Still another option can be to characterize the difference in temperature at a given location within the reaction zone at different times within a reaction cycle. For example, a temperature difference can be determined between the temperature at the end of the regeneration step and the temperature at the end of the conversion step. Such a temperature difference can be characterized at the location of peak temperature within the reactor, at the entrance to the conversion zone, at the exit from the conversion zone, or at any other convenient location.

In various aspects, the reaction conditions for performing the reverse water gas shift reaction can include one or more of an average conversion zone temperature ranging from 400° C. to 1200° (or more); a peak temperature within the conversion zone of 800° C. to 1500° C.; a temperature difference at the location of peak temperature between the end of a regeneration step and the end of the subsequent conversion step of 25° C. or more, or 50° C. or more, or 100° C. or more, or 200° C. or more, such as up to 800° C. or possibly still higher; a temperature difference at the entrance to the conversion zone between the end of a regeneration step and the end of the subsequent conversion step of 25° C. or more, or 50° C. or more, or 100° C. or more, or 200° C. or more, such as up to 800° C. or possibly still higher; and/or a temperature difference at the exit from the conversion zone between the end of a regeneration step and the end of the subsequent conversion step of 25° C. or more, or 50° C. or more, or 100° C. or more, or 200° C. or more, such as up to 800° C. or possibly still higher.

With regard to the average conversion zone temperature, in various aspects the average temperature for the conversion zone at the beginning of the conversion step can be 400° C. to 1500° C., or 400° C. to 1200° C., or 500° C. to 1500° C., or 500° C. to 1200° C., or 600° C. to 1500° C., or 600° C. to 1200° C., or 900° C. to 1500° C., or 900° C. to 1200° C., or 1000° C. to 1500° C., or 1000° C. to 1200° C. Additionally or alternately, with regard to the peak temperature for the conversion zone (likely corresponding to a location in the conversion zone close to the location for combustion of regeneration reactants), the peak temperature can be 800° C. to 1500° C., or 800° C. to 1400° C., or 1200° C. to 1500° C., or 1200° C. to 1400° C.

Additionally or alternately, the reaction conditions for the reverse water gas shift reaction can include a pressure of 0 psig to 1500 psig (10.3 MPa-g), or 0 psig to 1000 psig (6.9 MPa-g), or 200 psig (1.4 MPa-g) to 1500 psig (10.3 MPa-g), or 200 psig (1.4 MPa-g) to 1000 psig (6.9 MPa), or 290 psig (2.0 MPa-g) to 1500 psig (10.3 MPa), or 290 (2.0 MPa-g) psig to 1000 psig (6.9 MPa); and a gas hourly space velocity of reactants of 1000 $hr^{-1}$ to 50,000 $hr^{-1}$, or 10,000 $hr^{-1}$ to 50,000 $hr^{-1}$. The space velocity corresponds to the volume of reactants relative to the volume of monolith per unit time. The volume of the monolith is defined as the volume of the monolith as if it was a solid cylinder.

Example of Reverse Flow Reactor Configuration

For endothermic reactions operated at elevated temperatures, such as the reverse water gas shift reaction or hydrocarbon reforming, a reverse flow reactor can provide a suitable reaction environment for providing the heat for the endothermic reaction.

In a reverse flow reactor, the heat needed for an endothermic reaction may be provided by creating a high-temperature heat bubble in the middle of the reactor. A two-step process can then be used wherein heat is (a) added to the reactor bed(s) or monolith(s) via in-situ combustion, and then (b) removed from the bed in-situ via an endothermic process, such as reverse water gas shift, reforming, pyrolysis, or steam cracking. This type of configuration can provide the ability to consistently manage and confine the high temperature bubble in a reactor region(s) that can tolerate such conditions long term. A reverse flow reactor system can allow the primary endothermic and regeneration processes to be performed in a substantially continuous manner.

A reverse flow reactor system can include first and second reactors, oriented in a series relationship with each other with respect to a common flow path, and optionally but preferably along a common axis. The common axis may be horizontal, vertical, or otherwise. During a regeneration step, reactants (e.g., fuel and oxygen, and optional diluent) are permitted to combine or mix in a reaction zone to combust therein, in-situ, and create a high temperature zone or heat bubble inside a middle portion of the reactor system. The heat bubble can correspond to a temperature that is at least about the initial temperature for the endothermic reaction. Typically, the temperature of the heat bubble can be greater than the initial temperature for the endothermic reaction, as the temperature will decrease as heat is transferred from the heat bubble in a middle portion of the reactor toward the ends of the reactor. In some aspects, the combining can be enhanced by a reactant mixer that mixes the reactants to facilitate substantially complete combustion/reaction at the desired location, with the mixer optionally located between the first and second reactors. The combustion process can take place over a long enough duration that the flow of first and second reactants through the first reactor also serves to displace a substantial portion, (as desired) of the heat produced by the reaction (e.g., the heat bubble), into and at least partially through the second reactor, but preferably not all of the way through the second reactor to avoid waste of heat and overheating the second reactor. The flue gas may be exhausted through the second reactor, but preferably most of the heat is retained within the second reactor. The amount of heat displaced into the second reactor during the regeneration step can also be limited or determined by the desired exposure time or space velocity that the feed gas will have in the endothermic reaction environment.

After regeneration or heating the second reactor media (which can include and/or correspond to a ceramic catalyst composition as described herein), in the next/reverse step or cycle, reactants for the endothermic reaction can be supplied or flowed through the second reactor, from the direction opposite the direction of flow during the heating step. For example, in a reforming process, methane (and/or natural gas and/or another hydrocarbon) can be supplied or flowed through the second reactor. The methane can contact the hot second reactor and mixer media, in the heat bubble region, to transfer the heat to the methane for reaction energy.

Figure 6:
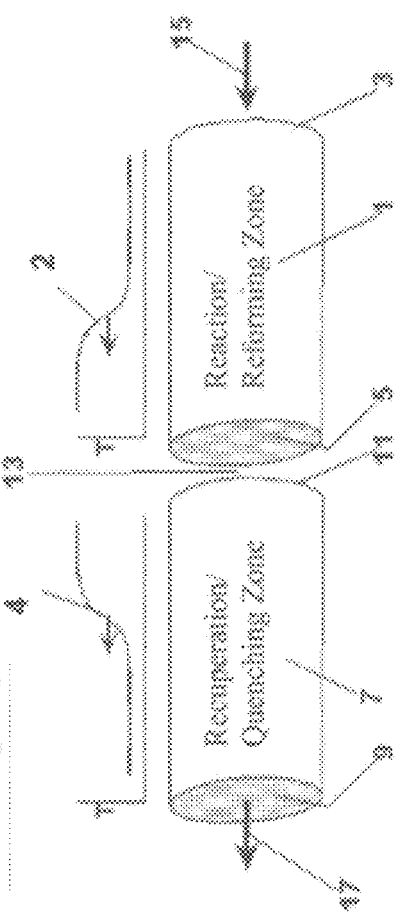
FIG. 6 shows an example of operation of a reverse flow reactor.
Figure 6:
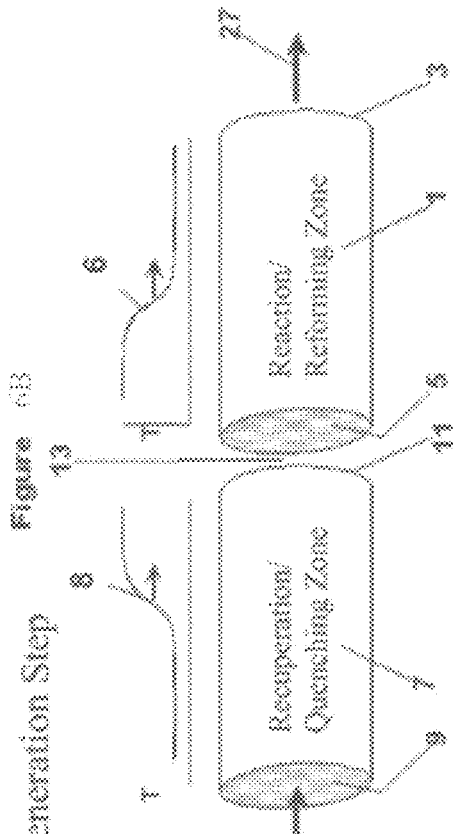

For some aspects, the basic two-step asymmetric cycle of a reverse flow regenerative bed reactor system is depicted in FIGS. 6A and 6B of FIG. 6 in terms of a reactor system having two zones/reactors; a first or recuperator/quenching zone (7) and a second or reaction zone (1). Both the reaction zone (1) and the recuperator zone (7) can contain regenerative monoliths and/or other regenerative structures formed from a doped ceramic composition. Regenerative monoliths or other regenerative structures, as used herein, comprise materials that are effective in storing and transferring heat as well as being effective for carrying out a chemical reaction. The regenerative monoliths and/or other structures can correspond to any convenient type of material that is suitable for storing heat, transferring heat, and catalyzing a reaction. Examples of structures can include bedding or packing material ceramic beads or spheres, ceramic honeycomb materials, ceramic tubes, extruded monoliths, and the like, provided they are competent to maintain integrity, functionality, and withstand long term exposure to temperatures in excess of 1200° C., or in excess of 1400° C., or in excess of 1600° C., which can allow for some operating margin. In some aspects, the catalytic ceramic monolith and/or other catalytic ceramic structure can be used without the presence of an additional washcoat.

To facilitate description of FIG. 6, the reactor is described herein with reference to a generic endothermic reaction. It is understood that various convenient types of endothermic reactions can generally be performed using a reverse flow reactor, such as the reactor shown in FIG. 6.

As shown in FIG. 6B of FIG. 6, at the beginning of the "reaction" step of the cycle, a secondary end 5 of the reaction zone 1 (a.k.a. herein as the second reactor) can be at an elevated temperature as compared to the primary end 3 of the reaction zone 1, and at least a portion (including the first end 9) of the recuperator or quench zone 7 (a.k.a. herein as the first reactor), can be at a lower temperature than the reaction zone 1 to provide a quenching effect for the resulting product. In an aspect where the reactors are used to perform reverse flow reforming, a reactant feed can be introduced via a conduit(s) 15, into a primary end 3 of the conversion or reaction zone 1.

The feed stream from inlet(s) 15 can absorb heat from reaction zone 1 and endothermically react to produce the desired conversion product. As this step proceeds, a shift in the temperature profile 2, as indicated by the arrow, can be created based on the heat transfer properties of the system. When the ceramic catalyst monolith/other catalyst structure is designed with adequate heat transfer capability, this profile can have a relatively sharp temperature gradient, which gradient can move across the reaction zone 1 as the conversion step proceeds. In some aspects, a sharper temperature gradient profile can provide for improved control over reaction conditions.

The effluent from the conversion reaction, which can include unreacted feed components as well as reaction products, can exit the reaction zone 1 through a secondary end 5 at an elevated temperature and pass through the recuperator reactor 7, entering through a second end 11, and exiting at a first end 9. The recuperator 7 can initially be at a lower temperature than the reaction zone 1. As the products (and optionally unreacted feed) from the reforming reaction pass through the recuperator zone 7, the gas can be quenched or cooled to a temperature approaching the temperature of the recuperator zone substantially at the first end 9, which in some embodiments can be approximately the same temperature as the regeneration feed introduced via conduit 19 into the recuperator 7 during the second step of the cycle. As the reforming effluent is cooled in the recuperator zone 7, a temperature gradient 4 can be created in the zone's regenerative bed(s) and can move across the recuperator zone 7 during this step. The quenching can heat the recuperator 7, which can be cooled again in the second step to later provide another quenching service and to prevent the size and location of the heat bubble from growing progressively through the quench reactor 7. After quenching, the reaction gas can exit the recuperator at 9 via conduit 17 and can be processed for separation and recovery of the various components.

The second step of the cycle, referred to as the regeneration step, can then begin with reintroduction of the first and second regeneration reactants via conduit(s) 19. The first and second reactants can pass separately through hot recuperator 7 toward the second end 11 of the recuperator 7, where they can be combined for exothermic reaction or combustion in or near a central region 13 of the reactor system.

An example of the regeneration step is illustrated in FIG. 6B of FIG. 6. Regeneration can entail transferring recovered sensible heat from the recuperator zone 7 to the reaction zone 1 to thermally regenerate the reaction beds 1 for the subsequent reaction cycle. Regeneration gas/reactants can enter recuperator zone 7, such as via conduit(s) 19, and flow through the recuperator zone 7 and into the reaction zone 1. In doing so, the temperature gradients 6 and 8 may move across the beds as illustrated by the arrows on the exemplary graphs in FIG. 6B, similar to but in opposite directions to the graphs of the temperature gradients developed during the reaction cycle in FIG. 6B of FIG. 6. Fuel and oxidant reactants may combust at a region proximate to the interface 13 of the recuperator zone 7 and the reaction zone 1. The heat recovered from the recuperator zone together with the heat of combustion can be transferred to the reaction zone, thermally regenerating the regenerative reaction monoliths and/or beds 1 disposed therein.

In some aspects, several of the conduits within a channel may convey a mixture of first and second reactants, due at least in part to some mixing at the first end (17) of the first reactor. However, the numbers of conduits conveying combustible mixtures of first and second reactants can be sufficiently low such that the majority of the stoichiometrically reactable reactants will not react until after exiting the second end of the first reactor. The axial location of initiation of combustion or exothermic reaction within those conduits conveying a mixture of reactants can be controlled by a combination of temperature, time, and fluid dynamics. Fuel and oxygen usually require a temperature-dependent and mixture-dependent autoignition time to combust. Still though, some reaction may occur within an axial portion of the conduits conveying a mixture of reactants. However, this reaction can be acceptable because the number of channels having such reaction can be sufficiently small that there is only an acceptable or inconsequential level of effect upon the overall heat balance within the reactor. The design details of a particular reactor system can be selected so as to avoid mixing of reactants within the conduits as much as reasonably possible.

Figure 7:
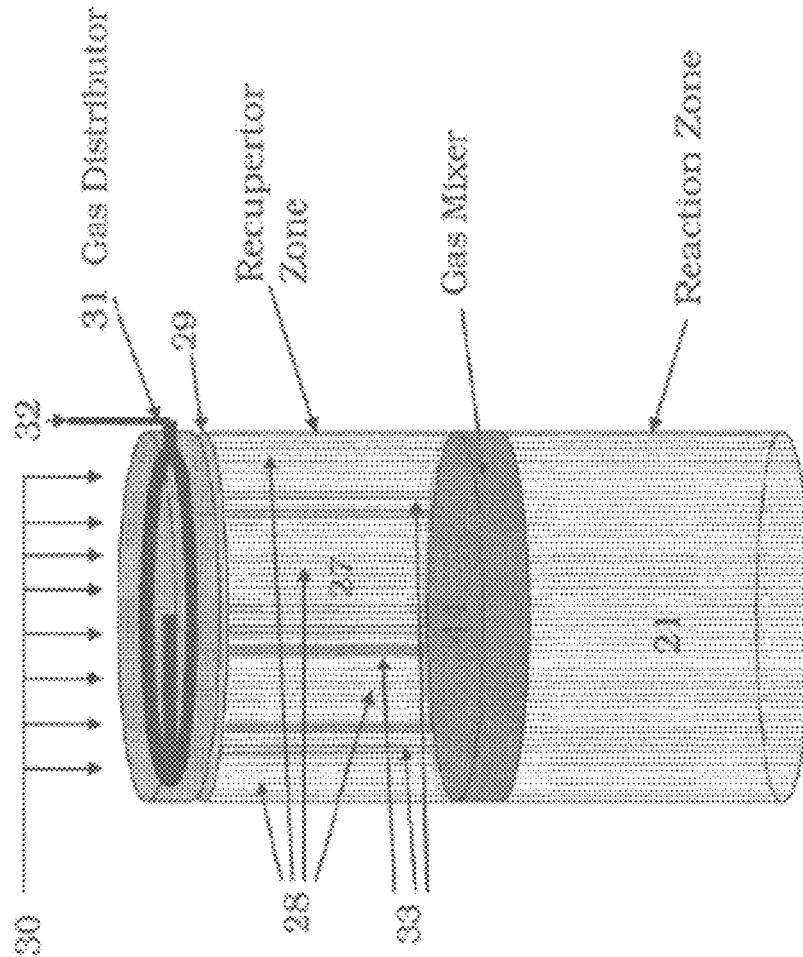
FIG. 7 shows an example of a reverse flow reactor.

FIG. 7 illustrates another exemplary reactor system that may be suitable in some applications for controlling and deferring the combustion of fuel and oxidant to achieve efficient regeneration heat. FIG. 7 depicts a single reactor system, operating in the regeneration cycle. The reactor system may be considered as comprising two reactors zones. The recuperator 27 can be the zone primarily where quenching takes place and provides substantially isolated flow paths or channels for transferring both of the quenching reaction gases through the reactor media, without incurring combustion until the gasses arrive proximate or within the reactor core 13 in FIG. 6. The conversion reactor 2 can be the reactor where regeneration heating and reverse water gas shift (or another endothermic reaction) primarily occurs, and may be considered as the second reactor for purposes herein. Although the first and second reactors in the reactor system are identified as separately distinguishable reactors, it is understood that the first and second reactors may be manufactured, provided, or otherwise combined into a common single reactor bed, whereby the reactor system might be described as comprising merely a single reactor that integrates both cycles within the reactor. The terms "first reactor" and "second reactor" can merely refer to the respective zones within the reactor system whereby each of the regeneration, conversion, quenching, etc., steps take place and do not require that separate components be utilized for the two reactors. However, various aspects can comprise a reactor system whereby the recuperator reactor includes conduits and channels as described herein, and the conversion reactor may similarly possess conduits. Additionally or alternately, some aspects may include a conversion reactor bed that is arranged different from and may even include different materials from, the recuperator reactor bed.

As discussed previously, the first reactor or recuperator 27 can include various gas conduits 28 for separately channeling two or more gases following entry into a first end 29 of the recuperator 27 and through the regenerative bed(s) disposed therein. A first gas 30 can enter a first end of a plurality of flow conduits 28. In addition to providing a flow channel, the conduits 28 can also comprise effective flow barriers (e.g., which effectively function such as conduit walls) to prevent cross flow or mixing between the first and second reactants and maintain a majority of the reactants effectively separated from each other until mixing is permitted. As discussed previously, each of the first and second channels can comprise multiple channels or flow paths. The first reactor may also comprise multiple substantially parallel flow segments, each comprising segregated first and second channels.

In some aspects, the recuperator can be comprised of one or more extruded honeycomb monoliths, as described above. Each monolith may provide flow channel(s) (e.g., flow paths) for one of the first or second reactants. Each channel preferably includes a plurality of conduits. Alternatively, a monolith may comprise one or more channels for each reactant with one or more channels or groups of conduits dedicated to flowing one or more streams of a reactant, while the remaining portion of conduits flow one or more streams of the other reactant. It is recognized that at the interface between channels, a number of conduits may convey a mixture of first and second reactant, but this number of conduits is proportionately small.

In aspects where a monolith is used, the monolith can have any convenient shape suitable for use as a catalytic surface. An example of a monolith can be an extruded honeycomb monolith. Honeycomb monoliths can be extruded structures that comprise many (e.g., a plurality, meaning more than one) small gas flow passages or conduits, arranged in parallel fashion with thin walls in between. A small reactor may include a single monolith, while a larger reactor can include a number of monoliths, while a still larger reactor may be substantially filled with an arrangement of many honeycomb monoliths. Each monolith may be formed by extruding monolith blocks with shaped (e.g., square or hexagonal) cross-section and two- or three-dimensionally stacking such blocks above, behind, and beside each other. Monoliths can be attractive as reactor internal structures because they provide high heat transfer capacity with minimum pressure drop.

In some aspects, honeycomb monoliths can be characterized as having open frontal area (or geometric void volume) between 25% and 80%, or 25% and 55%, and having conduit density between 50 and 2000 pores or cells per square inch (CPSI), or between 100 and 900 cells per square inch, or between 100 cells per square inch to 600 cells per square inch. For example, in one embodiment, the conduits may have a diameter/characteristic cell side length of only a few millimeters, such as on the order of roughly one millimeter. Reactor media components, such as the monoliths or alternative bed media, can provide for channels that include a packing with an average wetted surface area per unit volume that ranges from 50 $ft^{-1}$ to 3000 $ft^{-1}$ (~0.16 $km^{-1}$ to ~10 $km^{-1}$), or from 100 $ft^{-1}$ to 2500 $ft^{-1}$ (~0.32 $km^{-1}$ to ~8.2 $km^{-1}$), or from 200 $ft^{-1}$ to 2000 $ft^{-1}$ (~0.65 $km^{-1}$ to ~6.5 $km^{-1}$), based upon the volume of the first reactor that is used to convey a reactant. These relatively high surface area per unit volume values can aid in achieving a relatively quick change in the temperature through the reactor, such as generally illustrated by the relatively steep slopes in the exemplary temperature gradient profile graphs shown in FIG. 12(a) or 12(b) of FIG. 6.

Reactor media components can also provide for channels that include a packing that includes a high volumetric heat transfer coefficient (e.g., 0.02 $cal/cm^3$ s° C. or more, or 0.05 $cal/cm^3$ s° C. or more, or 0.10 $cal/cm^3$ s° C. or more, such as up to 0.50 $cal/cm^3$ s° C. or possibly still higher); that have low resistance to flow (low pressure drop); that have an operating temperature range consistent with the highest temperatures encountered during regeneration; that have high resistance to thermal shock; and/or that have high bulk heat capacity (e.g., 0.10 $cal/cm^{3\circ}$ C. or more, or 0.20 $cal/cm^{3\circ}$ C. or more, such as up to 0.80 $cal/cm^{3\circ}$ C. or possibly still higher). As with the high surface area values, these relatively high volumetric heat transfer coefficient values and/or other properties can aid in achieving a relatively quick change in the temperature through the reactor, such as generally illustrated by the relatively steep slopes in the exemplary temperature gradient profile graphs, such as in FIGS. 12(a) and 12(b) of FIG. 6. The cited values are averages based upon the volume of reactor used for conveyance of a reactant.

In various aspects, adequate heat transfer rate can be characterized by a heat transfer parameter, $\Delta THT$, below 500° C., or below 100° C., or below 50° C. The parameter $\Delta THT$, as used herein, is the ratio of the bed-average volumetric heat transfer rate that is needed for recuperation, to the volumetric heat transfer coefficient of the bed, hv. The volumetric heat transfer rate (e.g. $cal/cm^3$ sec) that is sufficient for recuperation can be calculated as the product of the gas flow rate (e.g. g/sec) with the gas heat capacity (e.g. cal/g° C.) and desired end-to-end temperature change (excluding any reaction, e.g. ° C.), and then this quantity can be divided by the volume (e.g. $cm^3$) of the reactor (or portion of a reactor) traversed by the gas. The volumetric heat transfer coefficient of the bed, hv, can typically be calculated as the product of an area-based coefficient (e.g. $cal/cm^2$ s° C.) and a specific surface area for heat transfer (av, e.g. $cm^2/cm^3$), often referred to as the wetted area of the packing.

In some aspects, a washcoat can be added to the formed, sintered ceramic composition. A washcoat can allow the sintered ceramic composition to be impregnated with additional catalytic metal.

One option for incorporating an additional catalytic metal into a washcoat can be to impregnate a catalyst support with the additional catalytic metal, such as by impregnation via incipient wetness. The impregnation can be performed with an aqueous solution of suitable metal salt or other catalytic metal precursor, such as tetramineplatinum nitrate or rhodium nitrate hydrate. The impregnated support can then be dried and/or calcined for decomposition of the catalytic metal precursor. A variety of temperature profiles can potentially be used for the heating steps. One or more initial drying steps can be used for drying the support, such as heating at a temperature from 100° C. to 200° C. for 0.5 hours to 24 hours. A calcination to decompose the catalytic metal precursor compound can be at a temperature of 200° C. to 800° C. for 0.5 hours to 24 hours, depending on the nature of the impregnated catalytic metal compound. Depending on the precursor for the catalytic metal, the drying step(s) and/or the decomposing calcination step(s) can be optional. Examples of additional catalytic metals can include, but are not limited to, Ni, Co, Fe, Pd, Rh, Ru, Pt, Ir, Cu, Ag, Au, Zr, Cr, Ti, V, W, Mo, Nb, Mn, Sr, La, and combinations thereof.

Alternative embodiments may use reactor media other than monoliths, such as whereby the channel conduits/flow paths may include a more tortuous pathways (e.g. convoluted, complex, winding and/or twisted but not linear or tubular), including but not limited to labyrinthine, variegated flow paths, conduits, tubes, slots, and/or a pore structure having channels through a portion(s) of the reactor and may include barrier portion, such as along an outer surface of a segment or within sub-segments, having substantially no effective permeability to gases, and/or other means suitable for preventing cross flow between the reactant gases and maintaining the first and second reactant gases substantially separated from each other while axially transiting the recuperator 27. For such embodiments, the complex flow path may create a lengthened effective flow path, increased surface area, and improved heat transfer. Such design may be preferred for reactor embodiments having a relatively short axial length through the reactor. Axially longer reactor lengths may experience increased pressure drops through the reactor. However for such embodiments, the porous and/or permeable media may include, for example, at least one of a packed bed, an arrangement of tiles, a permeable solid media, a substantially honeycomb-type structure, a fibrous arrangement, and a mesh-type lattice structure.

In some aspects, the reverse flow reactor can include some type of equipment or method to direct a flow stream of one of the reactants into a selected portion of the conduits. In the exemplary embodiment of FIG. 7, a gas distributor 31 can direct a second gas stream 32 to second gas stream channels that are substantially isolated from or not in fluid communication with the first gas channels, here illustrated as channels 33. The result can be that at least a portion of gas stream 33 is kept separate from gas stream 30 during axial transit of the recuperator 27. In some aspects, the regenerative bed(s) and/or monolith(s) of the recuperator zone can comprise channels having a gas or fluid barrier that isolates the first reactant channels from the second reactant channels. Thereby, both of the at least two reactant gases that transit the channel means may fully transit the regenerative bed(s), to quench the regenerative bed, absorb heat into the reactant gases, before combining to react with each other in the combustion zone.

In various aspects, gases (including fluids) 30 and 32 can each comprise a component that reacts with a component in the other reactant 30 and 32, to produce an exothermic reaction when combined. For example, each of the first and second reactant may comprise one of a fuel gas and an oxidant gas that combust or burn when combined with the other of the fuel and oxidant. By keeping the reactants substantially separated, the location of the heat release that occurs due to exothermic reaction can be controlled. In some aspects "substantially separated" can be defined to mean that at least 50 percent, or at least 75 percent, or at least 90 percent of the reactant having the smallest or limiting stoichiometrically reactable amount of reactant, as between the first and second reactant streams, has not become consumed by reaction by the point at which these gases have completed their axial transit of the recuperator 27. In this manner, the majority of the first reactant 30 can be kept isolated from the majority of the second reactant 32, and the majority of the heat release from the reaction of combining reactants 30 and 32 can take place after the reactants begin exiting the recuperator 27. The reactants can be gases, but optionally some reactants may comprise a liquid, mixture, or vapor phase.

The percent reaction for these regeneration streams is meant the percent of reaction that is possible based on the stoichiometry of the overall feed. For example, if gas 30 comprised 100 volumes of air (80 volumes $N_2$ and 20 Volumes $O_2$), and gas 32 comprised 10 volumes of hydrogen, then the maximum stoichiometric reaction would be the combustion of 10 volumes of hydrogen ($H_2$) with 5 volumes of oxygen ($O_2$) to make 10 volumes of $H_2O$. In this case, if 10 volumes of hydrogen were actually combusted in the recuperator zone (27), this would represent 100% reaction of the regeneration stream. This is despite the presence of residual un-reacted oxygen, because in this example the un-reacted oxygen was present in amounts above the stoichiometric requirement. Thus, in this example the hydrogen is the stoichiometrically limiting component. Using this definition, less than 50% reaction, or less than 25% reaction, or less than 10% reaction of the regeneration streams can occur during the axial transit of the recuperator (27).

In various aspects, channels 28 and 33 can comprise ceramic (including zirconia), alumina, or other refractory material capable of withstanding temperatures exceeding 1200° C., or 1400° C., or 1600° C. Additionally or alternately, channels 28 and 33 can have a wetted area between 50 $ft^{-1}$ and 3000 $ft^{-1}$, or between 100 $ft^{-1}$ and 2500 $ft^{-1}$, or between 200 $ft^{-1}$ and 2000 $ft^{-1}$.

Figure 2:
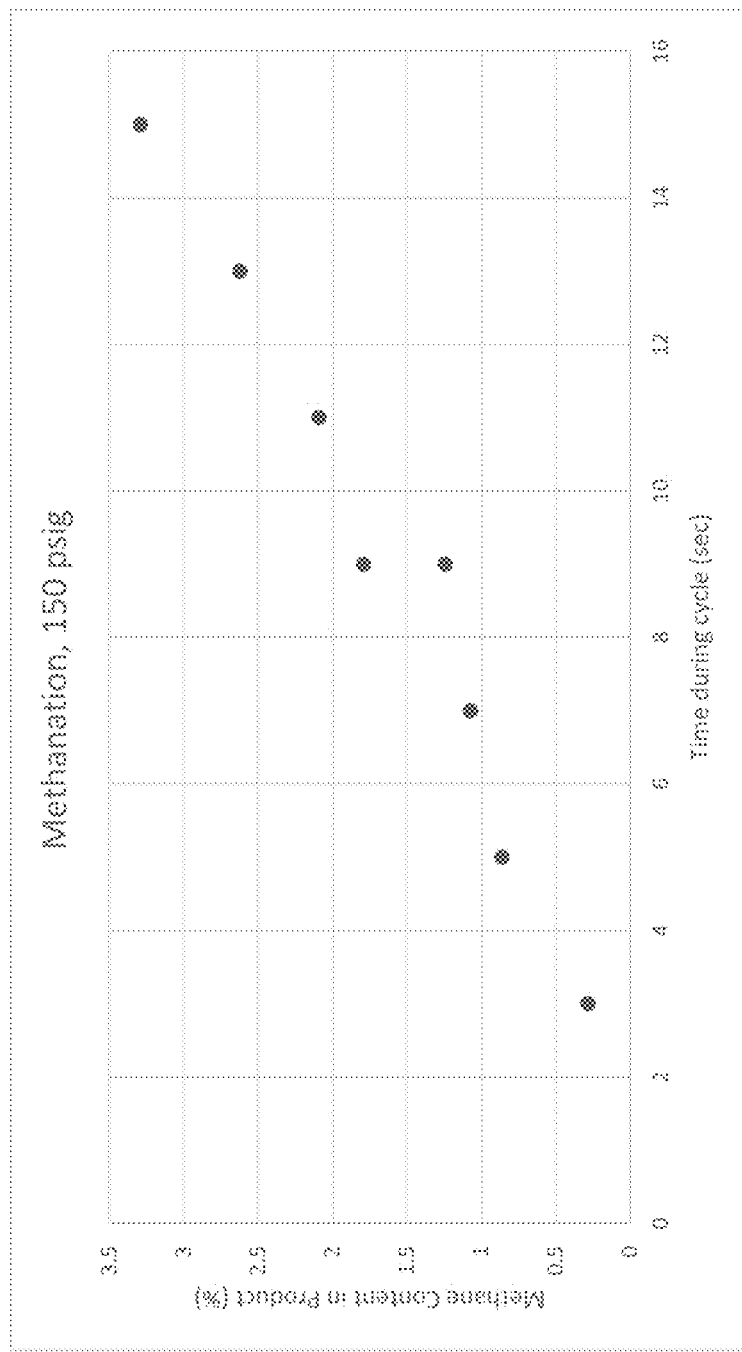
FIG. 2 shows methane formation during the water gas shift portion of the reaction cycle in a reverse flow reactor under the first set of conditions.

Referring again briefly to FIG. 6, the reactor system can include a first reactor 7 containing a first end 9 and a second end 11, and a second reactor 1 containing a primary end 3 and a secondary end 5. The embodiments illustrated in FIGS. 1 and 2 are merely simple illustrations provided for explanatory purposes only and are not intended to represent a comprehensive embodiment. Reference made to an "end" of a reactor merely refers to a distal portion of the reactor with respect to an axial mid-point of the reactor. Thus, to say that a gas enters or exits an "end" of the reactor, such as end 9, means merely that the gas may enter or exit substantially at any of the various points along an axis between the respective end face of the reactor and a mid-point of the reactor, but more preferably closer to the end face than to the mid-point. Thereby, one or both of the first and second reactant gases could enter at the respective end face, while the other is supplied to that respective end of the reactor through slots or ports in the circumferential or perimeter outer surface on the respective end of the reactor.

EXAMPLES

Figure 8:
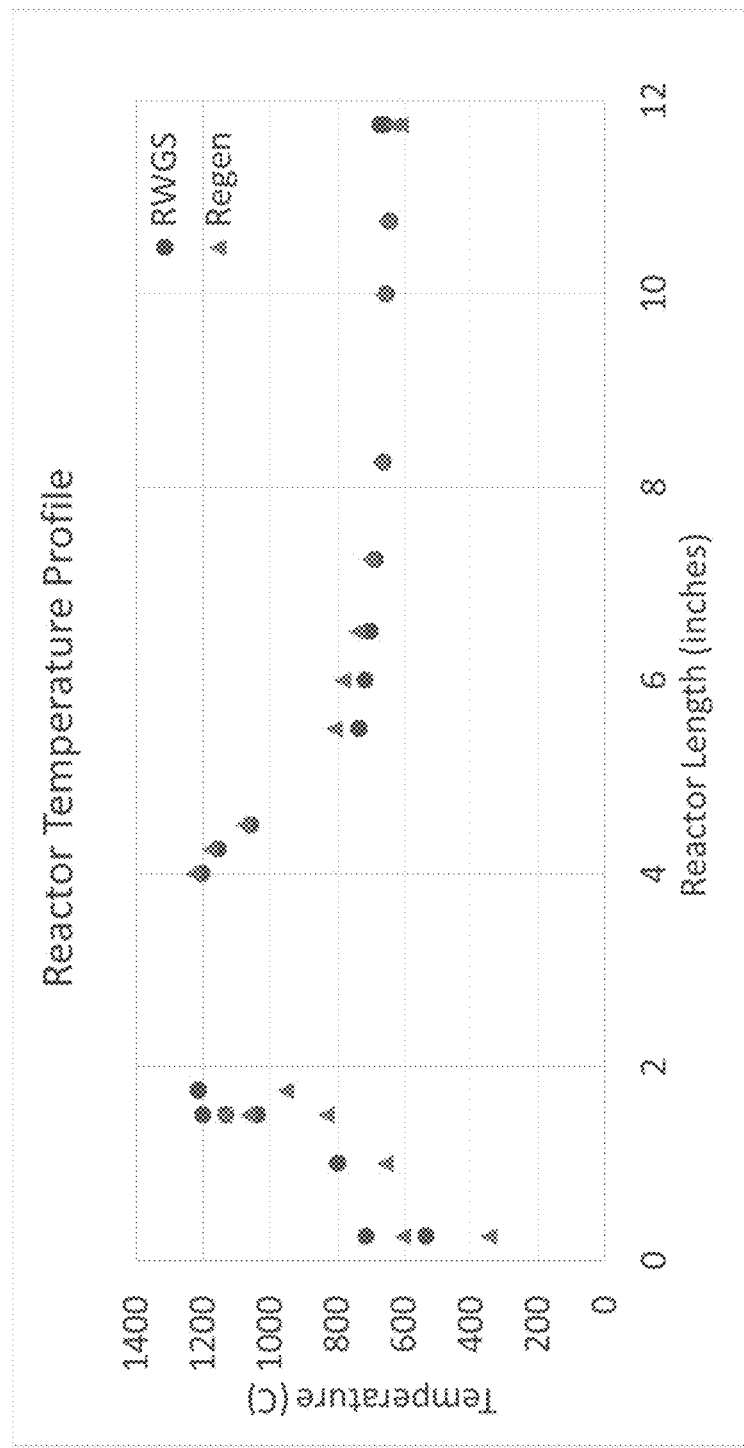
FIG. 8 shows an example of a temperature profile within a reverse flow reactor during a reaction cycle involving a reverse water gas shift reaction.

A pilot scale reactor (length of ~12 inches/~30 cm) was used to investigate performing the reverse water gas shift reaction in a reverse flow reactor system that included a reforming catalyst in the conversion zone. FIG. 8 shows an example of the temperature profile within the reactor at the end of the regeneration step (triangles) and at the end of the reverse water gas shift reaction (circles). The examples provided herein correspond to results from a single reactor, but those of skill in the art will readily understand the application of the following results to reaction systems including plurality of reverse flow reactors. The following examples show representative data at each operating condition. The operating conditions shown in each Example were maintained for at least an hour to verify that the results could be sustained over multiple operating cycles.

FIG. 1 shows results from a first operating condition for the reverse water gas shift reaction. In the first operating condition, the temperature profile was similar to FIG. 8. The conversion reaction was performed at 150 psig (~1.0 MPa-g) and a gas hourly space velocity (GHSV) of roughly 13,300 $hr^{-1}$ using a feed containing 25 vol % $CO_2$ and 75 vol % $H_2$. As shown in FIG. 1, at cycle times of 15 seconds or less, 90% or more of the $CO_2$ was converted. It is noted that the drop in $CO_2$ conversion at times greater than 15 seconds is due to the drop in temperature within the reactor toward the end of the reaction cycle. Thus, conversion could be maintained at 90% or more by selecting a shorter time for the reaction step.

The effluent from the first operating condition contained $H_2O$, CO, and $CH_4$ as reaction products. The $CH_4$ was produced via the methanation reaction, or reverse reforming. FIG. 2 shows the amount of methane in the reaction effluent during the reaction cycle. As shown in FIG. 2, although some methanation occurred, the amount of methanation was relatively low due to the high temperatures in the reverse flow reactor. In the portion of the cycle after 15 seconds, the amount of methane dropped off due to lack of $CO_2$ conversion at lower temperatures.

Figure 3:
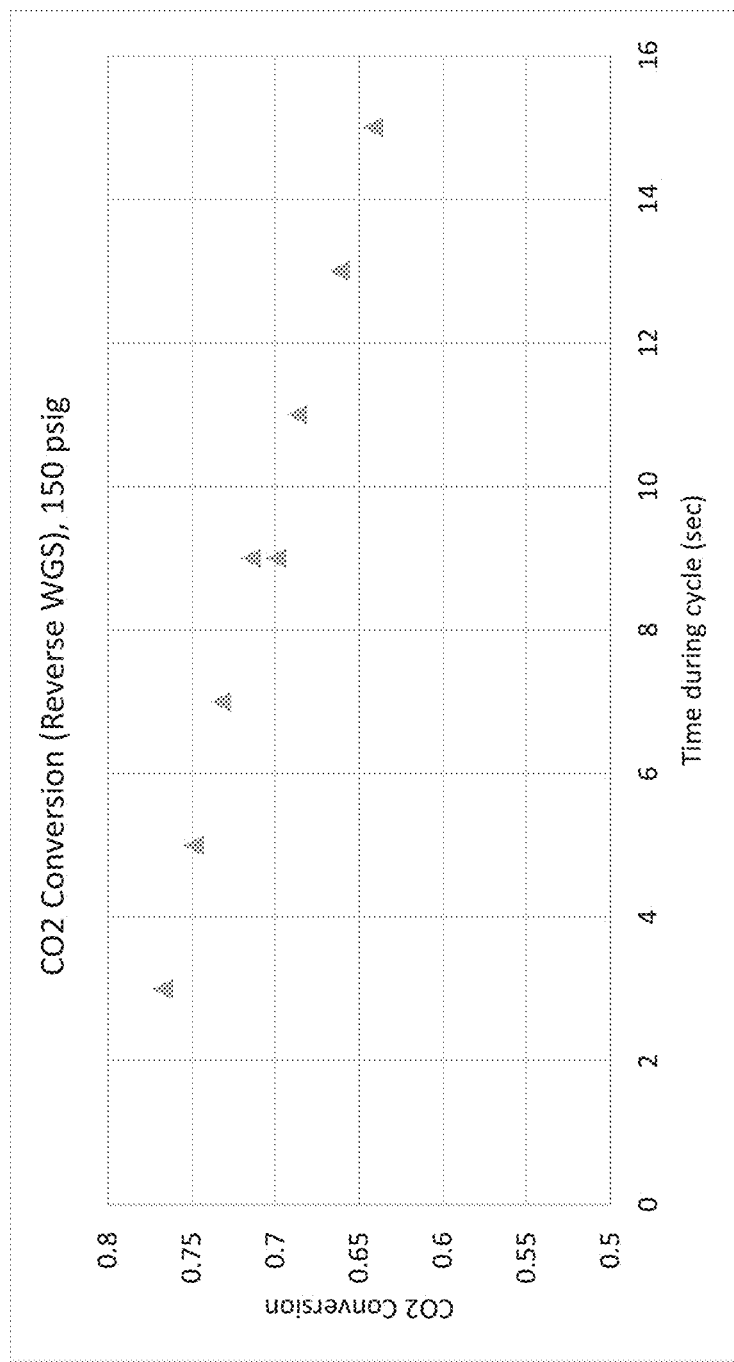
FIG. 3 shows $CO_2$ conversion during the water gas shift portion of the reaction cycle in a reverse flow reactor under a second set of conditions.

Although the methanation in the first operating condition was relatively low, at higher space velocities the amount of methanation increased. To reduce the amount of methanation, methane was added to the feed in a second operating condition. The second operating condition included a pressure of roughly 1.0 MPa-g, but the space velocity was roughly 2.5 times greater than the first operating condition (GHSV of ~37,500 $hr^{-1}$ on a total feed basis). The feed included to roughly 20 vol % $CO_2$, 47 vol % Hz, 7 vol % $CH_4$, and 27 vol % $H_2O$. FIG. 3 shows $CO_2$ conversion relative to the cycle time within the reaction step. As shown in FIG. 3, the conversion was near 70% throughout the cycle, with a modest decline as the reaction progressed. The increased space velocity in for the second operating condition is believed to be the cause of the decline in conversion within the cycle and the corresponding increase in methanation.

Figure 4:
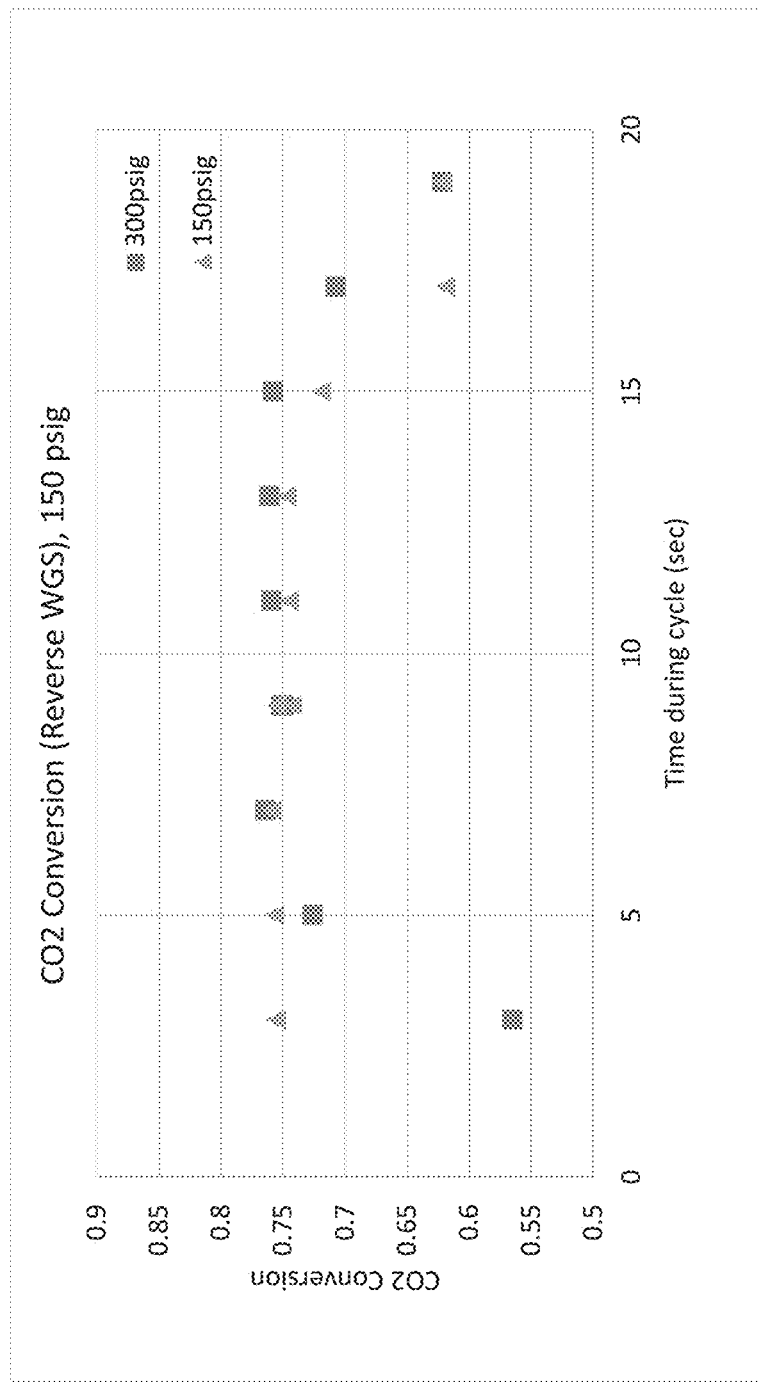
FIG. 4 shows $CO_2$ conversion during the water gas shift portion of the reaction cycle in a reverse flow reactor under additional sets of conditions.

FIG. 4 shows $CO_2$ conversion at a third and fourth operating condition. Both operating conditions included a GHSV of greater than 30,000 $hr^{-1}$ and a feed including 15.5 vol % $CO_2$, 46.5 vol % $H_2$, 34 vol % $H_2O$, and 4.0 vol % $CH_4$. The third operating condition included a pressure of 1.0 MPa-g while the fourth operating condition had a pressure of 2.0 MPa-g.

Figure 5:
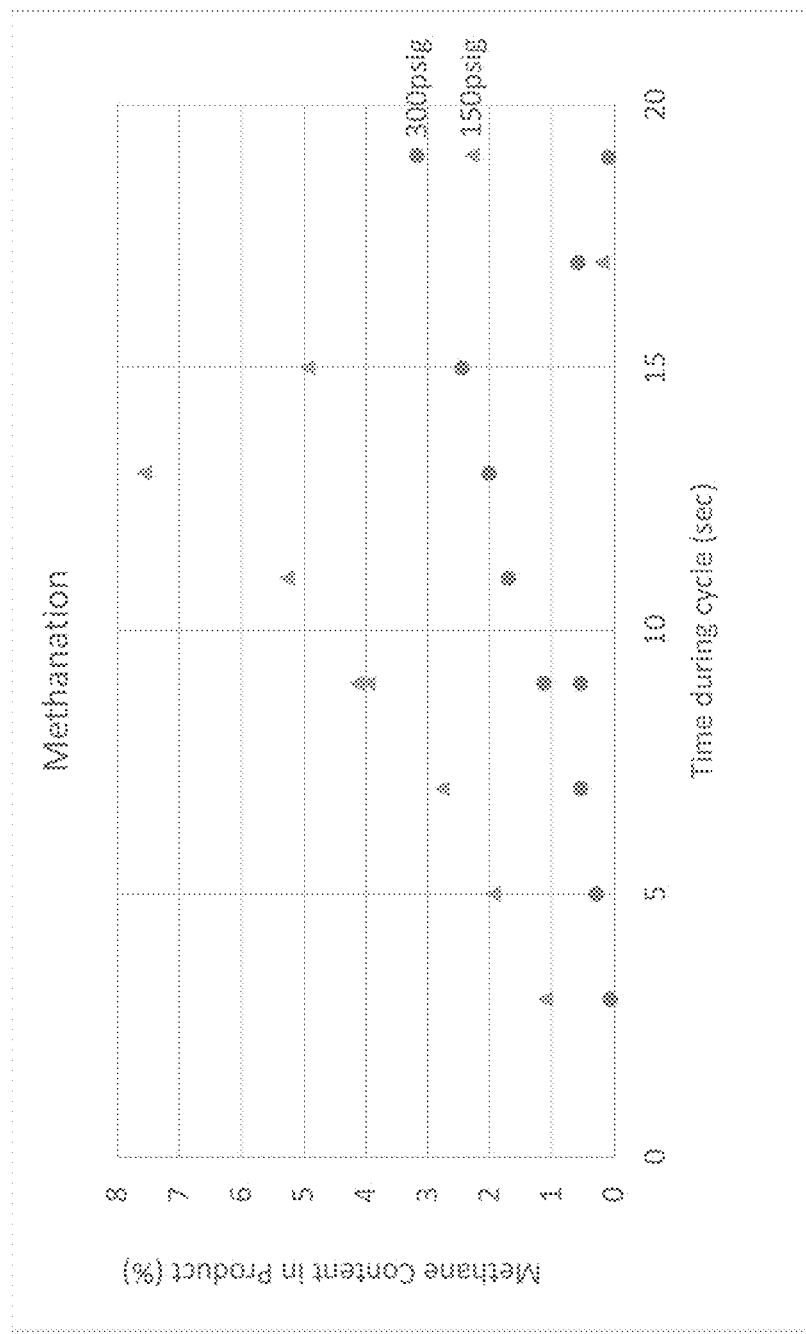
FIG. 5 shows methane content in the reaction products during the water gas shift portion of the reaction cycle in a reverse flow reactor under the additional sets of conditions.

As shown in FIG. 4, modifying the pressure did not have a substantial impact on the amount of $CO_2$ conversion. However, a benefit of increasing the pressure is shown in FIG. 5, which shows the amount of $CH_4$ in the reaction effluent. As shown in FIG. 5, increasing the pressure to 2.0 MPa-g resulted in a substantial increase in reforming. By contrast, at 1.0 MPa-g, during a portion of the reaction cycle the reaction resulted in a net production of $CH_4$ due to methanation.

Additional Example—Feed Preparation for Methanol Synthesis

The following is a prophetic example. A common industrial use for a synthesis gas feed is formation of methanol and/or dimethyl ether. After conversion to methanol and/or dimethyl ether, a variety of synthesis pathways are available for forming larger hydrocarbons.

Some methanol synthesis processes can have difficulties when the synthesis gas feed includes a substantial amount of $CO_2$. For example, a synthesis gas including 5.0 vol % or more of $CO_2$ can result in substantial coke formation on the methanol synthesis catalyst. This can reduce catalyst activity and/or run length for the methanol synthesis process.

Due to the difficulties with coking, it is preferred to have 5.0 vol % or less $CO_2$ in the synthesis gas feed. Unfortunately, for synthesis gas feeds including more than 5.0 vol % $CO_2$, the options for removal of $CO_2$ without removal of CO are limited. An amine wash could be used, but this also would result in substantially increasing the water content of the feed.

For synthesis gas feeds with more than 5.0 vol % $CO_2$, or 10 vol % or more, or 20 vol % or more, a reverse water gas shift reaction in a reverse flow reactor can be used to reduce the $CO_2$ content in the feed to 1.0 vol % to 5.0 vol %, or 1.0 vol % to 3.0 vol %. This can reduce or minimize the potential for coke formation during a process with a catalyst that is sensitive to $CO_2$ content. Additionally, the ability to reduce the $CO_2$ content to 3.0 vol % or less is in contrast to conventional synthesis gas formation methods, which often result in $CO_2$ contents of 4.0 vol % or more.

To convert a synthesis gas feed containing an elevated content of $CO_2$ into a feed with a $CO_2$ content of 5.0 vol % or less (or 3.0 vol % or less), the synthesis gas feed can optionally be supplemented with $H_2$, $CH_4$, and/or $H_2O$ and then passed into a reverse flow reactor. $H_2$ can be added so that the ratio of $H_2$ to $CO_2$ in the input flow to the reverse flow reactor is 2.0 or more, or 3.0 or more, or 5.0 or more. $CH_4$ and/or $H_2O$ can be added to help shift the reforming/methanation equilibrium toward formation of CO and $H_2$.

ADDITIONAL EMBODIMENTS

Embodiment 1. A method for performing a reaction in a reverse flow reactor, comprising: reacting a fuel mixture comprising fuel, 0.1 vol % or more of $O_2$, and a diluent under combustion conditions in a combustion zone within a reverse flow reactor to form a flue gas and to heat a conversion zone to an average conversion zone temperature of 400° C. or more, the conversion zone comprising a catalyst composition; and exposing a reactant stream comprising 5.0 vol % to 50 vol % $CO_2$, 20 vol % or more $H_2$, and a ratio of $H_2$ to $CO_2$ of 2.0 or more, to the catalyst composition in the conversion zone under reverse water gas shift reaction conditions to form a product stream comprising $H_2O$ and CO, a direction of flow for the reactant stream within the reaction zone being reversed relative to a direction of flow for the fuel mixture.

Embodiment 2. The method of Embodiment 1, wherein the reactant stream comprises a ratio of $H_2$ to $CO_2$ of 3.0 or more, or wherein the reactant stream comprises 10 vol % or more $CO_2$, or a combination thereof.

Embodiment 3. The method of any of the above embodiments, the method further comprising: mixing a synthesis gas feed comprising 10 vol % or more $CO_2$ with an $H_2$-containing stream to form the reactant stream.

Embodiment 4. The method of any of the above embodiments, wherein the product stream comprises $H_2$, the product stream comprising a syngas ratio of 2.0 or more.

Embodiment 5. The method of any of the above embodiments, wherein the conversion zone is heated to an average conversion zone temperature of 500° C. or more, or wherein a peak conversion zone temperature at the end of the reacting the fuel mixture is 800° C. or more, or a combination thereof.

Embodiment 6. The method of any of the above embodiments, further comprising: stopping the exposing of the reactant stream; and reacting, after the exposing, the fuel mixture under combustion conditions in the combustion zone to heat the conversion zone to the average conversion zone temperature.

Embodiment 7. The method of any of the above embodiments, wherein the reactant stream further comprises 0.5 vol % to 15 vol % of a reformable hydrocarbon, the reformable hydrocarbon optionally comprising methane.

Embodiment 8. The method of Embodiment 7, wherein the reactant stream further comprises 5.0 vol % to 50 vol % of $H_2O$, a ratio of $H_2O$ to reformable hydrocarbon being 3.0 or more.

Embodiment 9. The method of Embodiment 7 or 8, wherein the product stream comprises the reformable hydrocarbon, a volume percentage of the reformable hydrocarbon in the product stream being less than the volume percentage of the reformable hydrocarbon in the reactant stream during the exposing step.

Embodiment 10. The method of any of the above embodiments, wherein the reverse water gas shift conditions comprise a pressure of 1.4 MPa-g or more, or wherein the reverse water gas shift conditions comprise a gas hourly space velocity of 10,000 $hr^{-1}$ to 50,000 $hr^{-1}$, or a combination thereof.

Embodiment 11. The method of any of the above embodiments, wherein the catalyst composition comprises a reforming catalyst.

Embodiment 12. The method of Embodiment 11, wherein the catalyst composition comprises Ni, Co, Fe, Pd, Rh, Ru, Pt, Ir, Cu, Ag, Au, Zr, Cr, Ti, V, W, Mo, Nb, Mn, Sr, La, or a combination thereof.

Embodiment 13. The method of any of the above embodiments, wherein the fuel comprises $H_2$.

Embodiment 14. The method of any of the above embodiments, wherein the reactor comprises a reactor system, the reactor system comprising a recuperator portion and a portion including the conversion zone.

Embodiment 15. The method of any of the above embodiments, wherein the reverse water gas shift conditions comprise at least one of an average conversion zone temperature and a peak conversion zone temperature at the end of the reacting the fuel mixture.

Additional Embodiment A. The method of any of the above embodiments, wherein the reverse water gas shift conditions comprise a pressure of 0 MPa-g to 10.3 MPa-g, or 1.4 MPa-g to 10.3 MPa-g, and a gas hourly space velocity of 1,000 $hr^{-1}$ to 50,000 $hr^{-1}$, or 10,000 $hr^{-1}$ to 50,000 $hr^{-1}$.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for performing a reaction in a reverse flow reactor, comprising:
   reacting a fuel mixture comprising fuel, 0.1 vol % or more of $O_2$, and a diluent under combustion conditions in a combustion zone within a reverse flow reactor to form a flue gas and to heat a conversion zone to an average conversion zone temperature of 400° C. or more, the amount of $O_2$ in the fuel mixture being in excess of the stoichiometric amount for combustion of the fuel in the fuel mixture, the conversion zone comprising a catalyst composition; and
   exposing a reactant stream comprising 5.0 vol % to 50 vol % $CO_2$, 20 vol % or more $H_2$, and a ratio of $H_2$ to $CO_2$ of 2.0 or more, to the catalyst composition in the conversion zone under reverse water gas shift reaction conditions to form a product stream comprising $H_2O$ and CO, a direction of flow for the reactant stream within the reaction zone being reversed relative to a direction of flow for the fuel mixture.

2. The method of claim 1, wherein the reactant stream comprises a ratio of $H_2$ to $CO_2$ of 3.0 or more.

3. The method of claim 1, wherein the reactant stream comprises 10 vol % or more $CO_2$.

4. The method of claim 3, the method further comprising:
   mixing a synthesis gas feed comprising 10 vol % or more $CO_2$ with an $H_2$-containing stream to form the reactant stream.

5. The method of claim 1, wherein the product stream comprises $H_2$, the product stream comprising a syngas ratio of 2.0 or more.

6. The method of claim 1, wherein the conversion zone is heated to an average conversion zone temperature of 500° C. or more, or wherein a peak conversion zone temperature at the end of the reacting the fuel mixture is 800° C. or more, or a combination thereof.

7. The method of claim 1, further comprising:
   stopping the exposing of the reactant stream; and
   reacting, after the exposing, the fuel mixture under combustion conditions in the combustion zone to heat the conversion zone to the average conversion zone temperature.

8. The method of claim 1, wherein the reactant stream further comprises 0.5 vol % to 15 vol % of a reformable hydrocarbon, or wherein the reactant stream comprises 1.0 vol % to 15 vol % of methane.

9. The method of claim 8, wherein the reactant stream further comprises 5.0 vol % to 50 vol % of $H_2O$, a ratio of $H_2O$ to reformable hydrocarbon being 3.0 or more.

10. The method of claim 8, wherein the product stream comprises the reformable hydrocarbon, a volume percentage of the reformable hydrocarbon in the product stream being less than the volume percentage of the reformable hydrocarbon in the reactant stream during the exposing step.

11. The method of claim 1, wherein the catalyst composition comprises a reforming catalyst.

12. The method of claim 1, wherein the catalyst composition comprises Ni, Co, Fe, Pd, Rh, Ru, Pt, Ir, Cu, Ag, Au, Zr, Cr, Ti, V, W, Mo, Nb, Mn, Sr, La, or a combination thereof.

13. The method of claim 1, wherein the fuel comprises $H_2$.

14. The method of claim 1, wherein the reactor comprises a reactor system, the reactor system comprising a recuperator portion and a portion including the conversion zone.

15. The method of claim 1, wherein the reverse water gas shift conditions comprise a pressure of 0 psig to 1500 psig and a gas hourly space velocity of 1000 $hr^{-1}$ to 50,000 $hr^{-1}$.

16. The method of claim 1, wherein the reverse water gas shift conditions comprise a pressure of 200 psig to 1500 psig and a gas hourly space velocity of 10,000 $hr^{-1}$ to 50,000 $hr^{-1}$.

17. The method of claim 1, wherein the reverse water gas shift conditions comprise at least one of an average conversion zone temperature and a peak conversion zone temperature at the end of the reacting the fuel mixture.

18. A method for performing a reaction in a reverse flow reactor, comprising:
   reacting a fuel mixture comprising fuel, 0.1 vol % or more of $O_2$, and a diluent under combustion conditions in a combustion zone within a reverse flow reactor to form a flue gas and to heat a conversion zone to an average conversion zone temperature of 400° C. or more, the conversion zone comprising a catalyst composition; and
   exposing a reactant stream, different from the flue gas, comprising 5.0 vol % to 50 vol % $CO_2$, 20 vol % or more Hz, and a ratio of Hz to $CO_2$ of 2.0 or more, to the catalyst composition in the conversion zone under reverse water gas shift reaction conditions to form a product stream comprising $H_2O$ and CO, a direction of flow for the reactant stream within the reaction zone being reversed relative to a direction of flow for the fuel mixture.

19. The method of claim 18, further comprising exhausting the flue gas from the reverse flow reactor prior to exposing the reactant stream to the catalyst composition.

20. The method of claim 19, wherein exhausting the flue gas from the reverse flow reactor comprises purging the flue gas from the reverse flow reactor.

* * * * *